O. F. CARLSON.
CENTER SUPPORT BEARING.
APPLICATION FILED NOV. 6, 1918.

1,347,077.

Patented July 20, 1920.

Inventor
Oscar F. Carlson

UNITED STATES PATENT OFFICE.

OSCAR F. CARLSON, OF CHICAGO, ILLINOIS.

CENTER-SUPPORT BEARING.

1,347,077.     Specification of Letters Patent.     Patented July 20, 1920.

Application filed November 6, 1918. Serial No. 261,329.

*To all whom it may concern:*

Be it known that I, OSCAR F. CARLSON, a citizen of the United States, residing at Chicago, in the county of Cook and State of Illinois, have invented a certain new and useful Improvement in Center-Support Bearings, of which the following is a full, clear, concise, and exact description, reference being had to the accompanying drawings, forming a part of this application.

My invention relates to improvements in supports for power transmission shafts and has special reference to center support bearings for driving shafts for automobiles.

In the development of automobiles, especially large trucks designed for heavy work, the spacing between the engine at the front and the jack shaft or rear driving axle at the rear of the chassis, is frequently so great that the usual driving shaft with its universal connections at its ends becomes a source of weakness.

I have remedied this defect by the interposition of a bearing intermediate the ends of the driving shaft and supported on a suitable rigid cross member, forming a part of the chassis frame.

The bearing or support carries a short section of shaft and I connect this short section in the driving shaft by means of universal joint members at its ends.

It will be understood that my invention, while particularly useful in the situation described, is not thus limited in its application.

I am enabled, by means of my invention, to provide a connecting shaft which is mounted for rotation on a rigid part of the chassis, the shaft being supported upon anti-friction bearings and the several parts associated with the shaft being mutually interlocked in a simple and effective manner which permanently retains the several parts in their proper set or working relation, and with the use of a minimum number of elements or members.

My invention will be more readily understood from the following description taken in conjunction with said drawings, in which.

Figure 1:
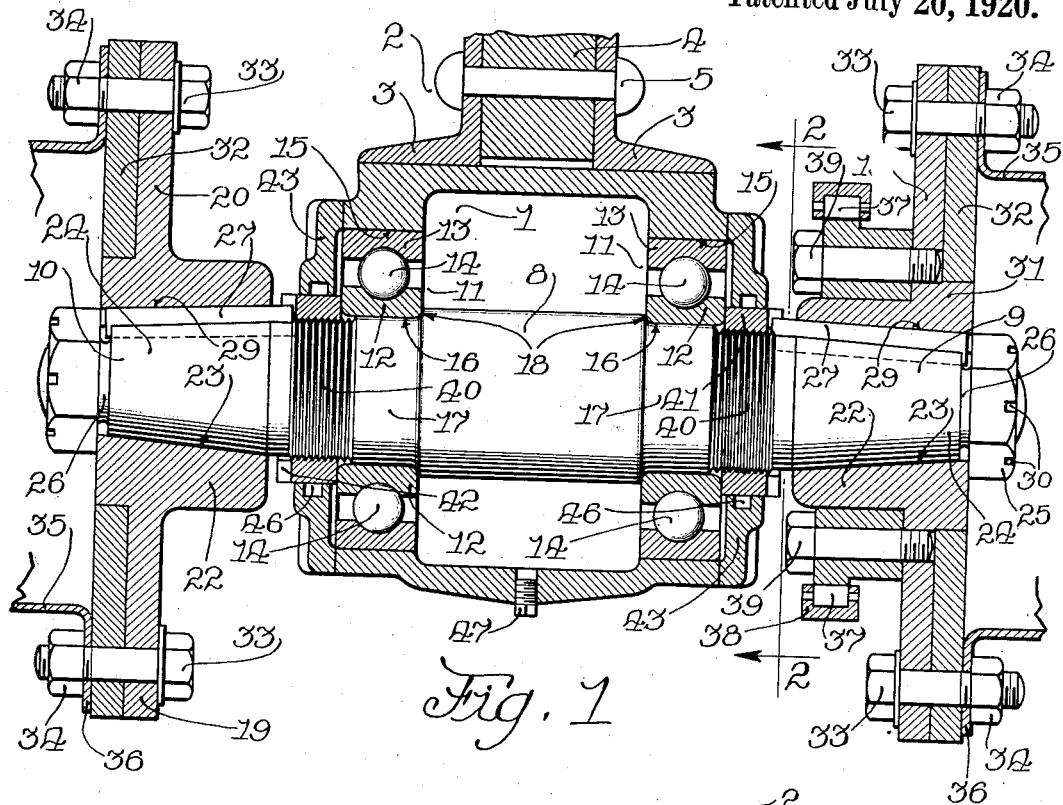
Figure 1 is a vertical, longitudinal, central section of the connection.
Figure 2:
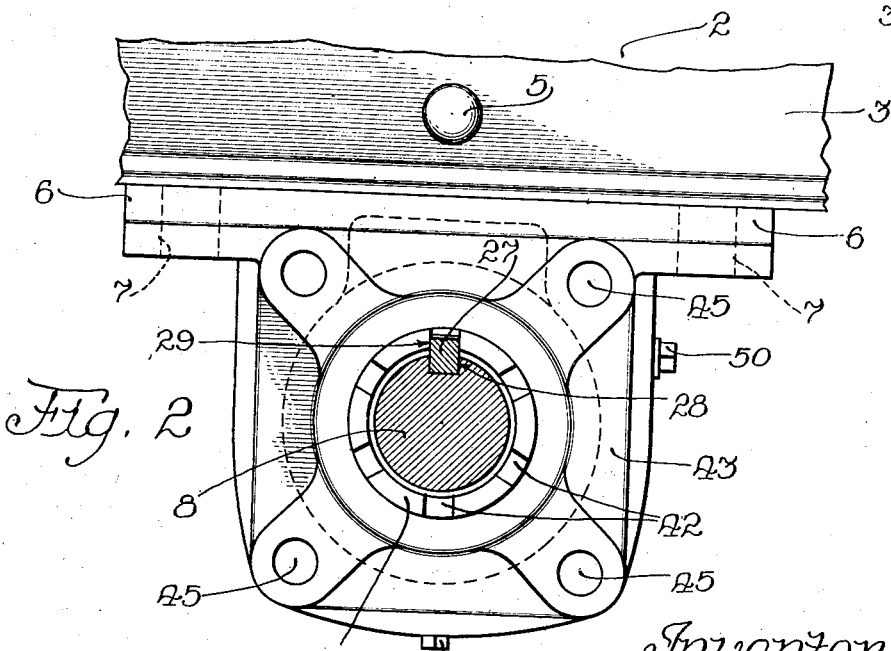
Fig. 2 is a vertical cross-section taken on the line 2—2 of Fig. 1.

The center support bearing of my invention as shown in the drawings comprises a bearing housing 1 adapted to be secured to or upon some suitable support as the beam 2.

The beam 2 shown, consists of two channel beams 3, arranged back to back and a rectangular filler or spacer bar 4 between them. The three bars are bound into a unitary structure or beam by rivets 5. This beam 2 may represent a cross bar in an automobile chassis, adapted to be secured at its ends to the side frames of the chassis.

As shown, the housing 1 is provided with side base flanges 6 having bolt holes 7 to receive bolts to secure the housing to the under side of the beam 2 and I preferably cut away the lower edge of the filler bar 4 so that the base of the housing will find a firm solid seat upon the flanges of the channel beams.

I mount a short shaft 8 within the housing, its ends 9 and 10 projecting beyond the housing at each side.

The housing is preferably in the form of a box closed on its top and bottom and lateral sides and open at its ends, through which open ends the shaft 8 projects. I mount the shaft in the housing on anti-friction bearings 11, one at each end of the housing. Each of these bearings consists of an inner bearing race or ring 12, which I secure upon the shaft, an outer bearing race or ring 13, which I mount in the housing 1, and a row of anti-friction elements 14, such as balls, which I arrange between the inner and outer races. The housing 1 is provided at each end with a cylindrical bore 15 to receive the outer ball races and fitting the outer circumferences of the ball races, which are also cylindrical. The inner surface 16 of the inner ball race 12 is also cylindrical and I provide the shaft 8 with a cylindrical section 17 for each of these races and closely fitting within them. I preferably provide each of the bearing rings with relatively deep raceways to receive the balls 14 so that the bearings not only support the shaft laterally but also serve as effective thrust bearings as well. To properly space the two inner rings 12 for spacing the bearings apart the desired distance, I provide the shaft 8 with two circumferential shoulders 18 suitably spaced longitudinally of the shaft and against which I set the inner rings of the bearings 11. I hold these inner rings or races 12 against the shoulders 18 by means to be more fully described.

As before mentioned, the device as a whole is especially adapted for interposition in the driving shaft of an automobile between the engine and the jack shaft, or the rear driving axle, and for this purpose I provide means at the ends of the shaft 8 for connection to or with suitable universal joint members, for the purpose of avoiding the necessity of exact alinement of the several parts of the automobile driving shaft. This means consists of a circumferential flange 19 at one end of the shaft 8 and a similar flange 20 at the other end. The flange 19 has a hub 22 provided with a tapered bore 23 which fits upon the end 24 of the shaft, which is correspondingly tapered. I force and hold the flange 19 tightly upon the tapered end of the shaft by means of a nut 25, the shaft being provided with a reduced threaded end 26 to receive the nut. For the purpose of positively holding the flange 19 against rotation on the shaft 8, I provide a key 27 fitting within a longitudinal key slot or keyway 28 in the tapered end of the shaft and also within a registering key slot 29 in the tapered bore 23 of the hub of the flange. In securing the flange upon the shaft I first place the key in the shaft keyway 28, then slide the flange onto the shaft and force it tightly upon the tapered end of the shaft by the nut 25. The nut may be secured against backing off by the common means of a cotter pin projecting through the notches 30 in the outer part of the nut and through a registering hole in the end of the shaft.

For connecting the flange 19 to a universal joint connection, I project the outer end of the hub 31 beyond the outer face of the flange 19 and upon which projection I mount a flat flange 32, which may be a part of a universal joint. The flange or plate 32 is preferably of equal diameter with the flange 19 and I secure these two flanges together by a plurality of through bolts 33 extending through registering holes in the flanges and arranged adjacent to their outer edges and provided with nuts 34. For inclosing the universal joints which are thus connected to the flanges 19 and 20, I provide sheet metal casings 35. I provide each casing with an outwardly extending circumferential flange 36, having holes to receive the bolts 33 and I secure these casings in place upon the flanges 32 beneath the nuts 34.

So far the description of the one flange 19 and its connections applies also to the other flange 20. I may provide one or both flanges with means for transmitting power to run some auxiliary device, as for instance, an electric generator. This means consists of a sprocket wheel 37 adapted to receive a driving chain 38, mounted concentrically on the hub 21 at the back of the flange 19 and secured thereon by means of bolts 39.

To clamp the inner bearing races 12 upon the shaft against the shoulders 18 I provide for each race 12 a screw threaded section 40 on the shaft 8 just beyond and of slightly smaller external diameter than the cylindrical seat 17 of the ring 12 and I provide a ring nut member 41 internally threaded to fit the threaded part of the shaft. I provide this threaded ring 41 with notches 42 in its outer end for convenience in turning the nut by means of a spanner wrench in the usual manner. The inner end of the member 41 is adapted to bear against the outer end of the race 12 and hold the race tightly clamped against the shoulder 16 on the shaft.

In all power transmission machinery of this class, which is subjected in use to such severe shocks and vibrations, it is necessary to lock the several parts in their adjusted positions. It is not sufficient to force a nut hard against a bearing surface to effect this locking. It is necessary, in addition, to lock the nut against retrograde movement so that should the strains incident to operation relieve the contact pressure between the nut and the surface against which it bears, the nut cannot turn back. I have devised a very simple and effective means for locking the threaded clamping ring 41 to hold it positively in its adjusted position. I preferably provide a plurality of the spanner notches 42, substantially equally circumferentially spaced and I make them of a width to receive and fit the inner end of the key 27, with which I lock or key the flange 19 to the shaft. I make the key 27 long enough to extend within the adjacent end of the nut member and in setting the nut member against the ring 12 I force it to a position where one of the spanner notches registers with the keyway 28, the inner end of which extends within the nut member to the bottom of the notches 42. I find, in setting the nut members which have at least 8 of the spanner notches that I experience no difficulty in setting the nut 41 tightly against the ring 12 and causing one of the notches 42 to register with the keyway. Having thus set the nut member and secured the ring 12 in place, I then proceed as described to secure the flange 19 on the shaft. I make the key 27 long enough to project into the notches of the nut member 41 and to extend substantially through the hub 22 so that even if the key should become loosened in use, it is prevented from escaping from the key slot by the nut 25 and it is thus positively held in locking engagement with the clamping ring 41.

I preferably make the housing 1 fluid tight so that it will serve the purpose of an oil reservoir for the bearings 11. For this purpose I provide a closing plate 43 at each end of the housing 1. Each of these plates has a bore 44 which fits the outer cylindrical surface of the nut member 41, a free running fit being provided at this point. I preferably make the plate 43 square in order to correspond with the shape of the housing 1 and I provide it with bolt holes 25 at its corners for receiving cap screws with which it is secured to the housing. To prevent the escape of lubricant at the running joint between the flange 43 and ring nut 41, I provide an internal groove 46 in the bore of the flange to receive a suitable soft packing ring such as felt, adapted to close this joint against the escape of lubricant.

I provide the housing with a suitable oil hole at one side which I close with a screw plug 50, which can be removed for filling the housing, and I also provide the housing with a drain plug 47 in its bottom for emptying and cleaning the housing.

The outer race rings 13 preferably float in the bores 15 so that they can accommodate themselves to register accurately with the inner rings 12 without friction and I provide a slight clearance 47 at each end in the inner face of the flanges 43 opposite to the race ring 13 to permit any necessary adjusting movement of the rings 13. To prevent the inner rings 12 from contacting with the flanges 43 I provide opposite to each ring 12 a deeper clearance space 48 in the flange. Such construction permits the outer rings to register accurately with the inner rings when they are set against the shoulders 18 and, should there be any tendency to force the shaft 8 endwise in the housing, the shaft will be limited in its endwise movement by the contacting of the non-rotating outer rings 13 against the stationary flanges 43 and not by the inner rotating rings 12 contacting with a stationary shoulder which would cause unnecessary friction.

As many obvious modifications of my invention will readily be suggested, I do not limit my invention to the specific structures herein shown and described except within the scope of the following claims.

I claim:

1. In a device of the kind described, a rotatable shaft, a shaft housing, a pair of anti-friction bearings rotatably mounting the shaft in the housing, each said bearing having an inner bearing ring carried on the shaft, the shaft having spaced shoulders for spacing the rings apart, a clamping ring threaded on the shaft adjacent to each bearing ring and adapted to clamp the rings against said shoulders, a longitudinal keyway in said shaft extending beyond each clamping ring, each clamping ring having a recess in its outer end registering with the adjacent keyway, a key in each keyway and entering the recess in its respective clamping ring, and means retaining said keys in their respective keyways.

2. In a device of the kind described, a rotatable shaft provided with flanges at its ends adapted to be connected to universal joint connections for interposing said shaft in a driving shaft, a bearing housing, a pair of anti-friction bearings for mounting said shaft in said housing, the bearings having inner bearing rings on the shaft, shoulders on the shaft for spacing said inner rings apart, threaded clamping rings on the shaft for holding said rings clamped against respective shoulders, a key carried by the shaft and having locking engagement with respective clamping rings and extending within the hubs of respective flanges, the outer ends of the shaft having threaded nuts thereon for holding said flanges on the shaft, said nuts holding said keys interlocked with said clamping rings.

3. In a device of the kind described, a rotatable shaft for interposition in an automobile driving shaft, flanges secured upon the ends of the shaft for carrying universal joint connections, a housing, means for rigidly mounting the housing on the chassis of an automobile, anti-friction bearings in the housing for supporting said shaft, the bearings having inner bearing rings carried by the shaft, spaced shoulders on the shaft for spacing said rings, internally threaded clamping rings on the shaft for clamping said rings against respective shoulders, the ends of the shaft having longitudinal keyways extending beyond respective clamping rings, said clamping rings provided with spanner notches in their outer ends adapted to register with respective keyways, keys in said keyways entering said notches and interlocking the respective clamping rings with the shaft, keyways within said flanges also receiving said keys, and means preventing longitudinal movement of the keys sufficient to disengage respective clamping rings.

4. In a device of the kind described, a closed center bearing housing adapted to be rigidly mounted on a fixed part of an automobile chassis, a relatively short rotatable shaft extending through the housing, ball bearings at the ends of the housing rotatably supporting said shaft, said bearings having inner bearing rings mounted on the shaft, shoulders on the shaft, threaded clamping rings on the shaft for holding the bearing rings clamped against said shoulders, keys carried by the shaft having interlocking engagement with the clamping rings, means for retaining the keys in interlocking engagement with the rings, closure plates for said housing surrounding said clamping rings and means preventing the escape of lubricant from the housing between the periphery of the clamping rings and said closure plates.

5. In a center bearing support of the kind described, in combination, a closed bearing housing adapted to contain lubricating oil, a shaft rotatably mounted in said housing anti-friction bearings comprising outer and inner raceways and interposed anti-friction elements for rotatably mounting said shaft in said housing, the outer rings mounted in alined bores in the housing, spaced shoulders on the shaft, rings interlocked with the shaft clamping the inner rings against said shoulders, said outer rings movable longitudinally of the shaft in their respective bores to register with the inner rings, closure plates for the housing surrounding said clamping rings, said closure plates limiting the side movement of said outer rings, and said closure plates formed to prevent contact thereof with the inner rings when the outer rings are in contact therewith.

6. In a center bearing support of the kind described, in combination, a bearing housing, a shaft within the housing, a pair of combined thrust and lateral anti-friction bearings rotatably supporting the shaft in said housing, each said bearing comprising an outer and an inner ball raceway ring and balls interposed between the rings in said raceways, the outer rings mounted in alined bores in the housing, spaced shoulders on the shaft, rings interlocked with the shaft clamping said inner rings against respective shoulders, the outer rings, movable in said bores to register with the inner rings, closing plates surrounding said clamping rings and closing the ends of the housing, said outer rings adapted to contact with said closure plates to limit the longitudinal movement of the shaft in the housing, and said plate cut away opposite to said inner rings to prevent contact therewith.

In witness whereof I hereunto subscribe my name this 4th day of November, A. D. 1918.

OSCAR F. CARLSON.